US012738187B1

(12) United States Patent
Chen

(10) Patent No.: US 12,738,187 B1
(45) Date of Patent: Sep. 15, 2026

(54) DISPLAY DEVICE, CONTROL METHOD AND NON-TRANSITORY COMPUTER READABLE STORAGE MEDIUM

(71) Applicant: AmTRAN Technology Co., Ltd., New Taipei City (TW)

(72) Inventor: Min I Chen, New Taipei City (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 19/318,409

(22) Filed: Sep. 4, 2025

(30) Foreign Application Priority Data

Mar. 11, 2025 (TW) ................................ 114108974

(51) Int. Cl.
*H05B 7/11* (2006.01)
*G09G 3/20* (2006.01)
*H05B 47/11* (2020.01)

(52) U.S. Cl.
CPC ............... *G09G 3/20* (2013.01); *H05B 47/11* (2020.01); *G09G 2330/021* (2013.01); *G09G 2330/045* (2013.01); *G09G 2354/00* (2013.01); *G09G 2360/144* (2013.01)

(58) Field of Classification Search
CPC ............... G09G 3/20; G09G 2330/021; G09G 2330/045; G09G 2354/00; G09G 2360/144; H05B 47/11
See application file for complete search history.

(56) References Cited

U.S. PATENT DOCUMENTS 8,884,866 B2 * 11/2014 Chen .................... G09G 3/3406 345/102
10,460,674 B1 * 10/2019 Liu ....................... G06F 1/3215
11,758,598 B1 * 9/2023 Narula .................. H04W 12/50 455/41.2
12,014,694 B1 * 6/2024 Eun ........................ G09G 3/342
12,405,914 B2 * 9/2025 Iijima ................. G06F 13/4282
2012/0170204 A1 * 7/2012 Ahn ...................... G06F 1/1656 361/679.41
2013/0183943 A1 7/2013 Tow et al.
(Continued)

FOREIGN PATENT DOCUMENTS

CN 111951723 A 11/2020
CN 116248813 A 6/2023
(Continued)

*Primary Examiner* — Antonio Xavier
(74) *Attorney, Agent, or Firm* — CKC & Partners Co., LLC

(57) ABSTRACT

A display device, comprising a display panel, a driving circuit, a connection port, a connection port and a power supply circuit. The driving circuit is configured to drive the display panel with a driving power. The power transmission circuit is configured to output an output power to the connection port. The power supply circuit is configured to supply power to the driving circuit and the power transmission circuit. The plurality of sensors is configured to sense at least one of a usage state and an environmental state of the display device and generate a detection signal. The processing circuit is coupled to the driving circuit, the power supply circuit, the power transmission circuit and the sensing circuit. The processing circuit is configured to determine the present operation state, so as to control the power supply circuit to dynamically adjust power distribution of the power supply circuit.

18 Claims, 5 Drawing Sheets

(56) References Cited

U.S. PATENT DOCUMENTS

| | | | | |
|---|---|---|---|---|
| 2015/0121095 | A1* | 4/2015 | Tsai | G06F 1/266<br>713/310 |
| 2019/0101972 | A1* | 4/2019 | Bibikar | G06F 9/30181 |
| 2019/0147783 | A1* | 5/2019 | Nam | G09G 3/3266<br>345/55 |
| 2021/0357234 | A1* | 11/2021 | Banik | G06F 9/4406 |
| 2022/0148489 | A1 | 5/2022 | Chih et al. | |

FOREIGN PATENT DOCUMENTS

| | | | |
|---|---|---|---|
| CN | 117475852 | A | 1/2024 |
| CN | 117498488 | A | 2/2024 |
| CN | 118298745 | A | 7/2024 |
| TW | I743409 | B | 10/2021 |

* cited by examiner

DISPLAY DEVICE, CONTROL METHOD AND NON-TRANSITORY COMPUTER READABLE STORAGE MEDIUM

CROSS-REFERENCE TO RELATED APPLICATION

This application claims priority to Taiwan Application Serial Number 114108974, filed Mar. 11, 2025, which is herein incorporated by reference in its entirety.

BACKGROUND

Technical Field

The present disclosure relates to a display device and power control technology, in particular to a display device, a control method and a non-transitory computer readable storage medium.

Description of Related Art

With the rapid development of electronic technology, display devices are widely applied to daily life, and functions of display devices are getting more diverse. As performance improves, the power consumption rate of display devices becomes increasingly faster. Therefore, how to effectively manage power has become a major challenge at present.

SUMMARY

One aspect of the present disclosure is a display device, comprising a display panel, a driving circuit, a connection port, a connection port and a power supply circuit. The driving circuit is coupled to the display panel and is configured to drive the display panel with a driving power. The connection port is electrically connected to an external device. The power transmission circuit is coupled to the connection port and is configured to output an output power to the connection port. The power supply circuit is coupled to the driving circuit and the power transmission circuit and is configured to supply power to the driving circuit and the power transmission circuit. The plurality of sensors is selected from a group comprising: a thermal sensor, a light sensor, a human body sensor, and an orientation sensor. The plurality of sensors is configured to sense at least one of a usage state and an environmental state of the display device and generate a detection signal corresponding to a present operation state of the display device. The processing circuit is coupled to the driving circuit, the power supply circuit, the power transmission circuit and the sensing circuit. The processing circuit is configured to determine the present operation state of the display device according to the detection signal and control the power supply circuit to dynamically adjust power distribution of the power supply circuit. The allocations of the driving power of the driving circuit and the output power of the power transmission circuit are dynamically adjusted.

Another aspect of the present disclosure is a control method of a display device. The display device comprises a display panel, a driving circuit, a connection port, a power transmission circuit, a power supply circuit, a plurality of sensors, and a processing circuit. The control method comprising: the plurality of sensors sensing at least one of a usage state and an environmental state of the display device and generating a detection signal; the processing circuit determining a present operation state of the display device according to the detection signal; the processing circuit controlling the power supply circuit to dynamically adjust power distribution of the power supply circuit, wherein a driving power of the driving circuit and an output power of the power transmission circuit are selectively adjusted; outputting the driving power to drive the display panel; and outputting the output power to the connection port, wherein the connection port is electrically connected to an external device.

Another aspect of the present disclosure is an non-transitory computer readable storage medium, which is applied to a display device, and stored at least one computer readable instruction. The at least one computer readable instruction is executed by a processing circuit to perform a control method. The control method comprises: obtaining a detection signal from a plurality of sensors of the display device, wherein the detection signal is generated by the plurality of sensors according to at least one of a usage state and an environmental state of the display device; determining a present operation state of the display device according to the detection signal; controlling a power supply circuit of the display device to dynamically adjust power distribution of the power supply circuit, wherein allocations of a driving power of a driving circuit and an output power of a power transmission circuit in the display device are dynamically adjusted; controlling the power supply circuit to output the driving power to drive a display panel of the display device; and controlling the power transmission circuit to output the output power to a connection port, wherein the connection port is electrically connected to an external device.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes associated listed items or any and all combinations of more.

Figure 1A:
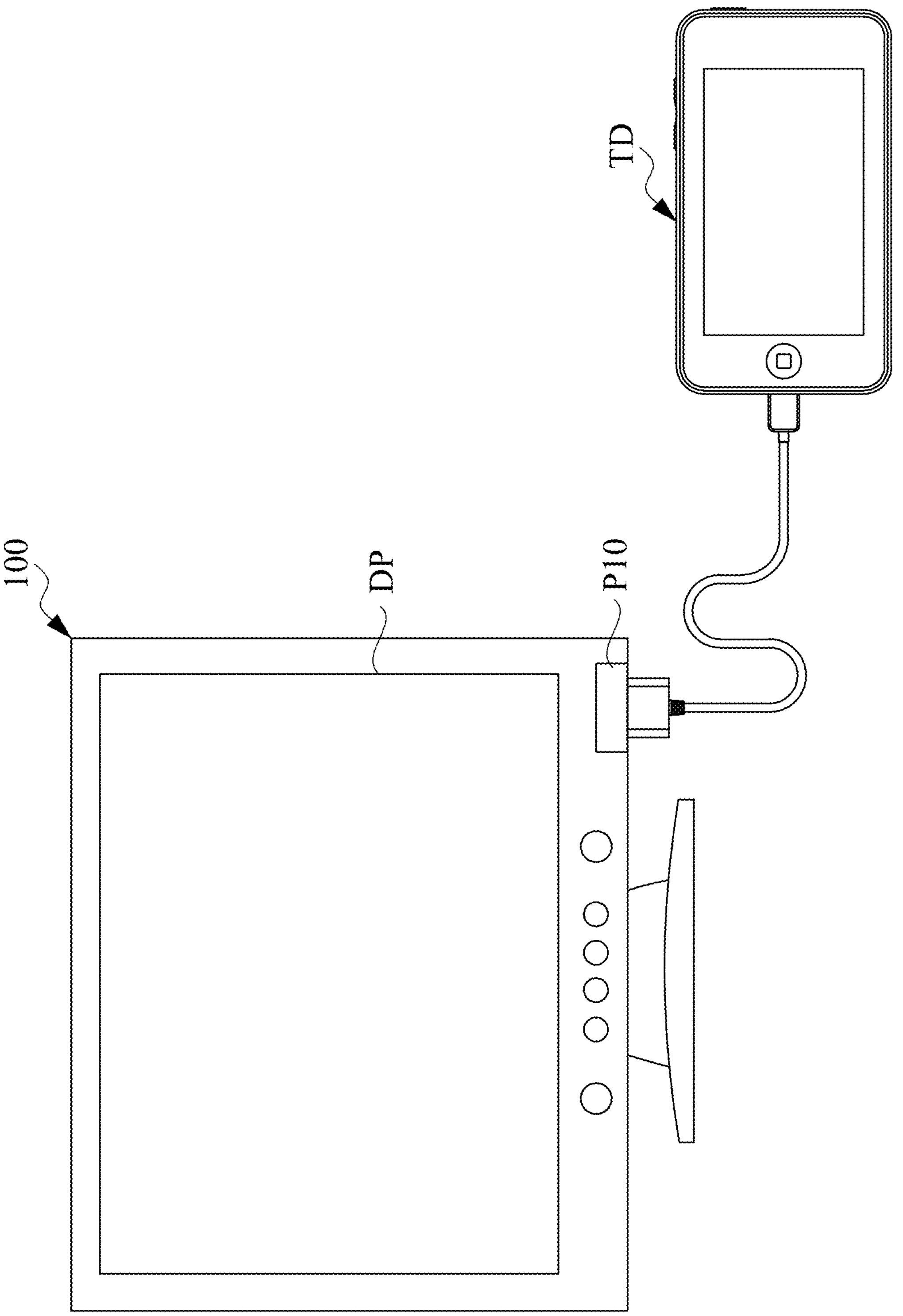
FIG. 1A is a schematic diagram of the usage state of the display device in some embodiments of the present disclosure.

FIG. 1A is a schematic diagram of the usage state of the display device 100 in some embodiments of the present disclosure. The display device 100 is configured to present a display screen on a display panel DP according to a display signal, such as a computer screen or a TV screen. The display panel DP is, for example, an LCD (Liquid-Crystal Display) monitor, an organic light-emitting diode (OLED), a thin film transistor liquid crystal display (TFT-LCD) monitor, but the present disclosure is not limited thereto.

The display device 100 can obtain a driving power through an internal battery unit or by connecting to an external power source (e.g., mains power). As shown in FIG. 1A, the display device 100 has a connection port P10. In one embodiment, the connection port P10 is a Type-C universal serial bus connector. The display device 100 is configured to supply an output power through the connection port P10, so as to charge an external device (e.g., the terminal device TD that can be electrically connected to the connection port P10, such as a smart phone or tablet computer, as shown in FIG. 1A).

In other words, the display device 100 shown in FIG. 1A can supply the output power in addition to displaying the image. Therefore, when the user is watching the image displayed by the display device 100, the display device 100 can be applied to charge the terminal device TD at the same time. However, the driving power that the display device 100 can obtain is limited, such as the voltage of the power supply is fixed. If the output power to the connection port P10 is not controlled and occupies excessive portion of the driving power, the display quality of the display device 100 may be affected, and may even affect the service life of the display device 100.

Figure 1B:
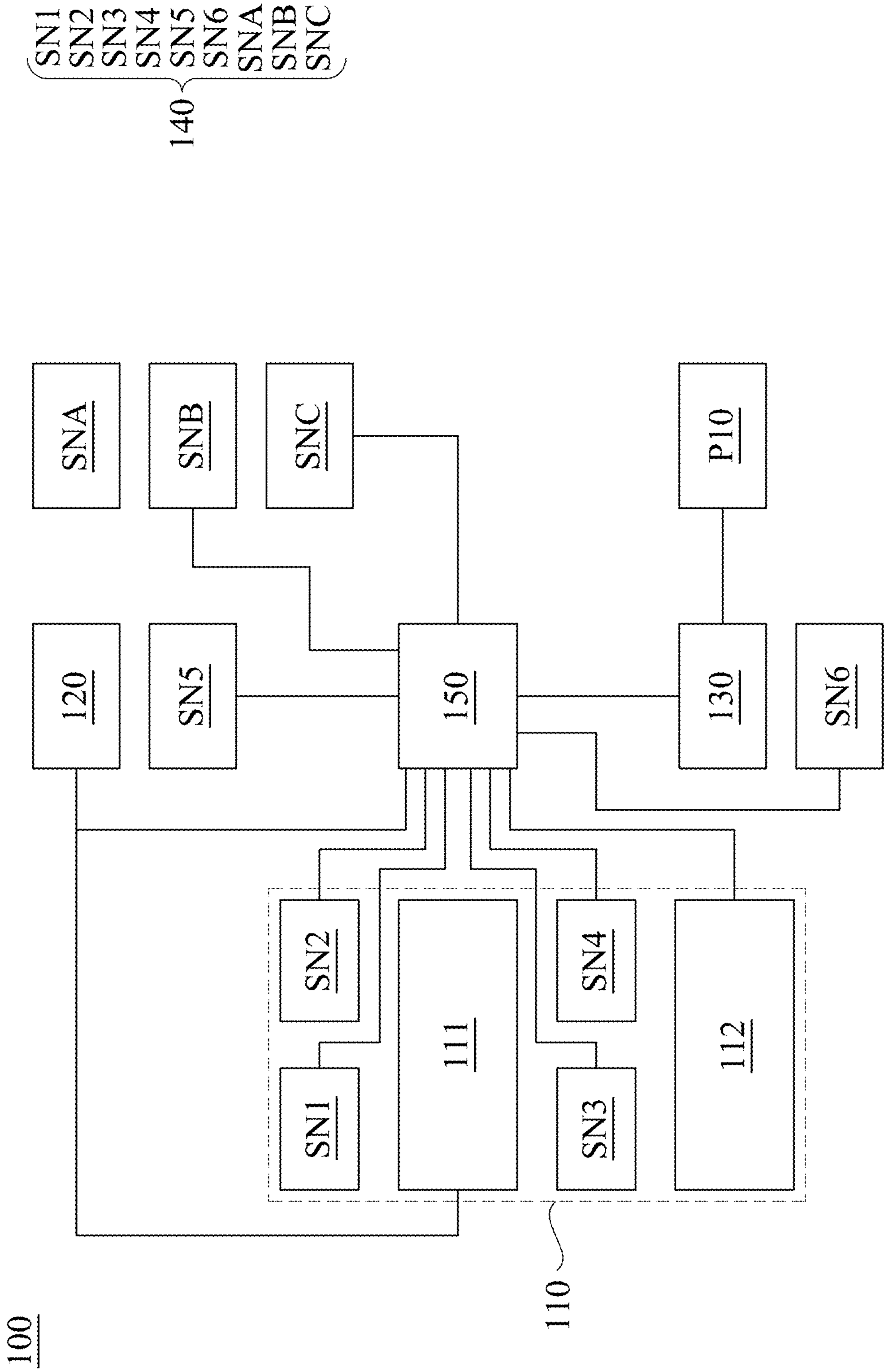
FIG. 1B is a schematic diagram of the circuits of the display device in some embodiments of the present disclosure.

Referring to FIG. 1A and FIG. 1B, FIG. 1B is a schematic diagram of the circuits of the display device 100 in some embodiments of the present disclosure. The display device 100 includes a driving circuit 110, a power supply circuit 120, a power transmission circuit 130, a sensing circuit 140 and a processing circuit 150.

In one embodiment, the driving circuit 110 is coupled to the display panel DP shown in FIG. 1A, is configured to drive multiple pixel units in the display panel DP with the driving power, but the present disclosure is not limited thereto. In other embodiments, the driving circuit 110 may be a part of the display panel DP or independently disposed outside of the display panel DP.

The driving circuit 110 includes a light source driving unit 111 and a timing control unit 112, the light source driving unit 111 can be a driving chip or a portion of a system on chip (SOC), and the light source driving unit 111 outputs a light source driving signal to the display panel DP. Taking an LCD panel as an example, the LCD panel has a backlight module. Therefore, the light source driving signal output by the light source driving unit 111 is configured to control the backlight module to emit light, so as to adjust the display brightness of the display panel. In one embodiment, the light source driving unit 111 also includes the driving circuit of the LCD panel and controls the LCD panel to present the display screen. Taking an OLED panel as an example, the OLED panel has a light-emitting layer. Therefore, the light source driving signal output by the light source driving unit 111 is configured to control the voltage applied to the light-emitting layer, so as to enable the organic material to generate corresponding light, thereby adjusting the display brightness of the display panel. In one embodiment, the light source driving unit 111 also controls the OLED panel to present the display screen.

The timing control unit 112 may also be an integrated circuit chip or a portion of a system on chip, and is coupled to the light source driving unit 111. The timing control unit 112 is configured to provide a timing signal to the light source driving unit 111. The light source driving unit 111 will generate a light source driving signal according to the timing signal, so that the display panel DP presents the image.

The power supply circuit 120 is a voltage conversion unit (e.g., a power supply unit), and is arranged in the display device 100. The power supply circuit 120 is coupled to the driving circuit 110 and the processing circuit 150. The power supply circuit 120 can obtain supply power from an external power source or an energy storage unit (e.g., a battery module), and, based on the obtained supply power, supply power to the driving circuit 110 and the power transmission circuit 130. For convenience of description, in subsequent paragraphs, the power supplied by the power supply circuit 120 to the driving circuit 110 is uniformly referred to as "driving power", and the processing circuit 150 can provide a control signal to the power supply circuit 120 to change the magnitude of the driving power.

The power transmission circuit 130 is arranged in the display device 100 and is coupled to the processing circuit 150 and the connection port P10. The power transmission circuit 130 can obtain power from the power supply circuit 120 through the processing circuit 150, so as to generate the output power and supply the output power to the connection port P10. When the terminal device TD is connected to the connection port P10, the power transmission circuit 130 can output the output power through the connection port P10 to charge the terminal device TD. For convenience of description, in subsequent paragraphs, the power applied by the display device 100 to supply power to the terminal device TD is uniformly referred to as "output power", and the processing circuit 150 can provide a control signal to the power transmission circuit 130 to change the magnitude of the output power. In one embodiment, the voltage or current of the output power complies with the Type C charging specification (e.g., USB Power Delivery).

The sensing circuit 140 is arranged on the surface or inside of the display device 100. Multiple sensors of the sensing circuit 140 can be selected from a group, which includes a thermal sensor, a light sensor, a human body sensor, and an orientation sensor. Each sensor is coupled to the processing circuit 150, and is configured to sense at least one or more of "the usage state of the display device 100" or "the environmental state of the display device 100 (e.g., the environmental state around or inside the display device 100)". Specifically, the sensing circuit 140 can detect internal parameters of the display device 100 (e.g., temperature) or detect environmental parameters around the display device 100 (e.g., the ambient light). The detection result will be used to generate the detection signal, or output as the detection signal, the detection signal corresponds to present operation state of the display device 100. In one embodiment, the multiple sensors include multiple thermal sensors SN1-SN6, a light sensor SNA, a human body sensor SNB, and an orientation sensor SNC shown in FIG. 1B. The application of the detection signal will be detailed in subsequent paragraphs.

The processing circuit 150 is coupled to the display panel DP (or the driving circuit 110), the power supply circuit 120, the power transmission circuit 130 and the sensing circuit 140. The processing circuit 150 is configured to determine the present operation state of the display device 100 according to the detection signal, and can respectively provide the control signals to the power supply circuit 120 and the power transmission circuit 130 to change the magnitude of the driving power and the magnitude of the output power. Specifically, the processing circuit 150 may dynamically adjust power distribution of the power supply circuit 120, and the allocations of the driving power of the driving circuit 110 and the output power of the power transmission circuit 130 are dynamically adjusted. Since the total power that the power supply circuit 120 can supply is limited or fixed, the processing circuit 150 can selectively increase and decrease the driving power and the output power.

Specifically, the driving power and the output power may be controlled or adjusted by the processing circuit 150 in a corresponding manner. When the processing circuit 150 decreases the driving power, the processing circuit 150 can correspondingly increase the output power. On the other hand, if the processing circuit 150 determines that the power required by the display panel DP or the driving circuit 110 increases, the processing circuit 150 will increase the driving power and decrease the output power correspondingly. Accordingly, by detecting the internal parameters or external environmental parameters of the display device 100, the allocations of the driving power and the output power can be dynamically adjusted, which ensures the internal power distributions of the display device 100 will not to affect the display performance of the display panel DP, and at the same time, the internal power utilization of the display device 100 can be optimized.

Figure 2:
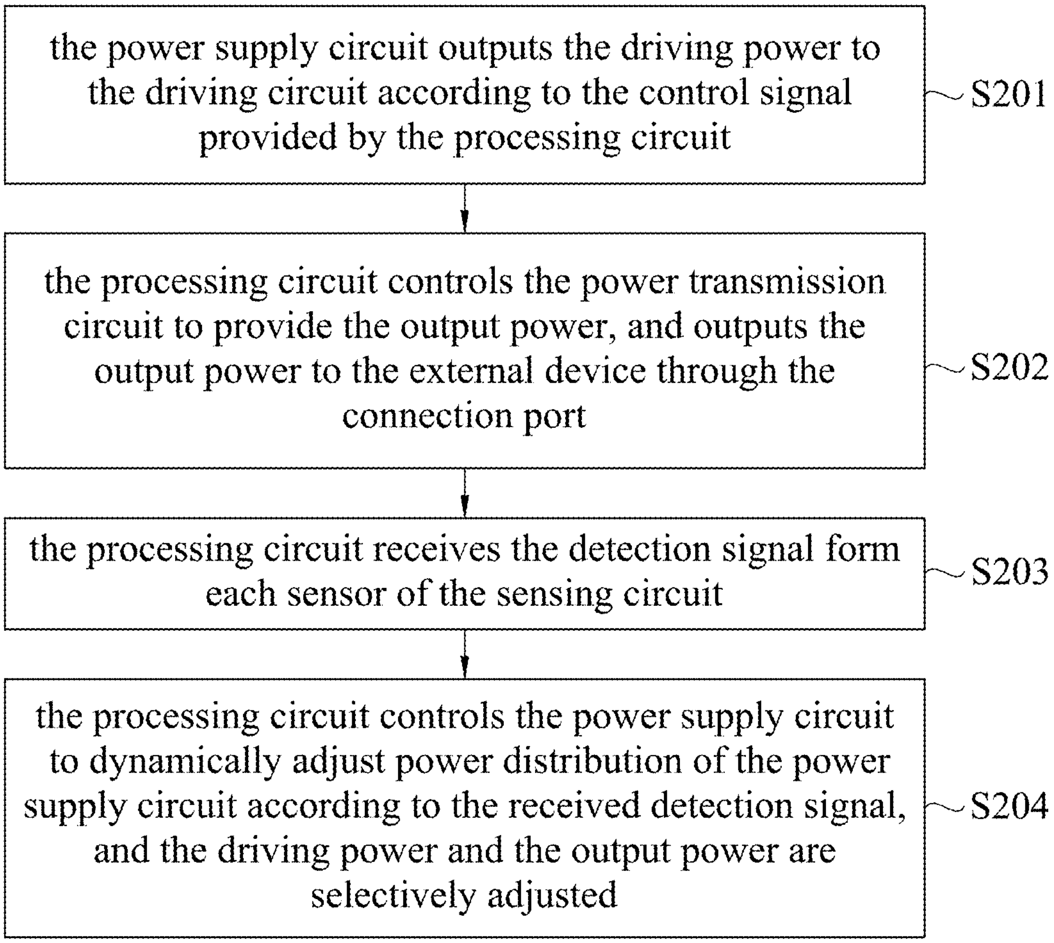
FIG. 2 is a flowchart illustrating a control method in some embodiments of the present disclosure.

FIG. 2 is a flowchart illustrating a control method in some embodiments of the present disclosure. The control method can also be implemented by the non-transitory computer readable storage medium, such as the processing circuit 150 and its memory. The non-transitory computer readable storage medium can include/store one or more computer readable instructions. When the processing circuit 150 executes the computer readable instructions, the computer readable instructions enable the processing circuit 150 to perform the control method shown in the aforementioned FIG. 2.

In step S201, when the display device 100 is activated, the power supply circuit 120 obtains a supply power and supplies power to the processing circuit 150 for operation. In addition, the power supply circuit 120 outputs the driving power to the driving circuit 110 according to the control signal provided by the processing circuit 150, so that the driving circuit 110 drives the display panel DP with the driving power. As mentioned above, the power supply circuit 120 can obtain the supply power from an internal battery of the display device 100 or an external power source and supply the driving power therefrom.

In step S202, when the external device (e.g., the terminal device TD shown in FIG. 1A) is connected to the connection port P10, the processing circuit 150 controls the power transmission circuit 130 to supply the output power, and outputs the output power to the external device through the connection port P10.

In step S203, during the operation of the display device 100, the processing circuit 150 regularly or in real-time obtains/receives the detection signal from each sensor of the sensing circuit 140. The sensing circuit 140 determines the present operation state of the display device 100. Specifically, the sensing circuit 140 can detect at least one or more of "the usage states of the display device 100" and "the environmental states around the display device 100", so as to generate the detection result (detection signal). For example, the sensing circuit 140 is configured to detect the internal temperature of the display device 100 (e.g., by the thermal sensors SN1-SN6), detect the ambient light corresponding to the display panel DP of the display device 100 (e.g., by the light sensor SNA), detect the setting angle of the display device 100 (e.g., by the orientation sensor SNC), or detect the signal for recognizing an object outside of the display device 100 (e.g., by the human body sensor SNB), and accordingly generate the detection result. The processing circuit 150 can use or combine the detection result from one or more sensors as the detection signal, or generate the detection signal based on the detection result from the one or more sensors.

In step S204, the processing circuit 150 controls the power supply circuit 120 to dynamically adjust power distribution of the power supply circuit 120, wherein the driving power of the driving circuit 110 and the output power of the power transmission circuit 130 are selectively adjusted. Specifically, the processing circuit 150 will control the power supply circuit 120 and the power transmission circuit 130 to adjust the magnitude of the driving power and the magnitude of the output power according to the received detection signal. In one embodiment, the driving circuit 110 will change the display brightness presented by the display panel DP according to the magnitude of the received driving power, such as changing the backlight brightness of the backlight module, or changing the light-emitting brightness of the OLED.

In one embodiment, the adjustment of the driving power made by the processing circuit 150 is contrary to the adjustment of the output power. For example, when the driving power is increased, the output power is decreased, and if the output power is increased, then the driving power is decreased. In other words, the processing circuit 150 evaluates the present state of the display device 100 according to the detection signal, and allocates the magnitude of power supplied to the driving circuit 110 and the power transmission circuit 130 accordingly. However, the present disclosure is not limited thereto. In other embodiments, the adjustment of the driving power and the output power by the processing circuit 150 may be different, and priority of the adjustment to the driving power and the output power may be set, such as adjusting the driving power or the output power prior to the other one.

In one embodiment, the adjustment of the driving power can be adjusting the driving voltage or current provided to the driving circuit 110. The adjustment of the output power can be adjusting the voltage provided to the power transmission circuit 130, such as reducing from 20 volts to 10 volts. In another embodiment, the processing circuit 150 can adjust a control signal of the power transmission circuit 130, which changes the output power. For example, the duty cycle of a pulse width modulation signal may be decreased, which changes the operation mode of a power switch in the power transmission circuit 130, thereby changing the output power of the power transmission circuit 130.

The details of how the processing circuit 150 adjusts or allocates the driving power based on various detection signals are described hereinafter. In one embodiment, the processing circuit 150 detects the internal temperature of the display device 100 by the thermal sensors SN1-SN6, so as to generate the detection signal. When the detection signal (the internal temperature) exceeds a preset temperature threshold value, it indicates that the load of the display device 100 may be too high, and the processing circuit 150 simultaneously decreases both the driving power and the output power to reduce the load of the display device 100 at this time.

As mentioned above, after decreasing the driving power and the output power, if the internal temperature gradually returns to below the temperature threshold value, the processing circuit 150 prioritizes the increase of the driving power in order to ensure the display performance of the display panel DP. Then, if the internal temperature remains below the temperature threshold value in a period of time (e.g., 1 minute, which can be adjusted according to requirements), the processing circuit 150 increases the output power accordingly.

In one embodiment, the thermal sensors SN1-SN4 are arranged in the display device 100 to detect the internal temperature of the display device 100, such as being disposed at positions adjacent to the driving circuit 110 to detect the temperature during the operation of the driving circuit 110, including the light source driving unit 111 and the timing control unit 112. The thermal sensor SN5 and the thermal sensor SN6 are respectively arranged in the display device 100 at positions adjacent to the power supply circuit 120 and the power transmission circuit 130 to respectively detect the temperature during the operation of the power supply circuit 120 and the power transmission circuit 130. In some embodiments, the thermal sensors are also arranged to detect the temperature of various positions on the main board, power board, or the back surface of display panel DP.

In one embodiment, the processing circuit 150 detects the ambient light around the display device 100 by the light sensor SNA. The light sensor SNA can be exposed on the surface of the display device 100 to detect the ambient light corresponding to the display panel DP (e.g., the ambient brightness around the display panel), and generate the detection signal according to the detected brightness value, so the driving power and/or the output power can be selectively adjusted accordingly. The aforementioned embodiments describe the approach for adjusting the driving power and/or the output power based on "specific type of detection signal" separately, but the present disclosure can also adjust the driving power and/or the output power according to the analysis results of multiple detection signals from various sensors, wherein the detection signals may be analyzed together. Referring to the table below, which shows the operations of the display device 100 in different embodiments, where a "V" mark indicates that the component is involved in the control method.

| Type | Component name | Example A | Example B | Example C |
|---|---|---|---|---|
| Controller | the processing circuit | V | V | V |
| Sensor | power sensor | V | V | V |
| | the thermal sensor | | V | V |
| | the orientation sensor | | | V |
| | the ambient light sensor | V | V | |
| | the backlight sensor | V | | |
| | the human body sensor | | V | |
| Controlled Device | the light source driving unit of LCD | | V | V |
| | the light source driving unit of OLED | | V | |
| | the power transmission circuit | V | V | V |
| | the power supply circuit | V | | |
| | Audio Circuit | | V | |

As shown in Example A in the table above, in one embodiment, the processing circuit 150 detects the operating power of the power transmission circuit 130 by a power sensor (not shown in the figure), and obtains the ambient light and the display brightness of the display panel DP detected by the ambient light sensor (e.g., the light sensor SNA) and a backlight sensor (not shown in the figure). In one embodiment, the processing circuit 150 can also evaluate the display brightness of the display panel DP according to the current magnitude of the driving power.

The processing circuit 150 can selectively adjust the driving power and/or the output power according to the brightness of the ambient light and the display brightness. For example, if both the ambient light and the display brightness are greater than a threshold value indicating the display device 100 is not in a standby status for saving power, the processing circuit 150 can control the power transmission circuit 130 to increase the output power. If both the ambient light and the display brightness are greater than another threshold value indicating high driving power is required to provide necessary display brightness, the processing circuit 150 can control the power transmission circuit 130 to decrease the output power. In another embodiment, the processing circuit 150 compares the brightness of the ambient light and the display brightness. For example, when the display brightness is greater than the brightness of the ambient light, and the difference between the display brightness and the brightness of the ambient light is also greater than a brightness threshold value, it indicates that the display device 100 may be in a dim environment, and the present display brightness of the display panel DP is too high. At this time, the processing circuit 150 will decrease the driving power supplied by the power supply circuit 120 to the driving circuit 110, so as to decrease the display brightness of the display panel DP. At the same time, the processing circuit 150 can control the power transmission circuit 130 to increase the output power.

On the other hand, when the display brightness is lower than the brightness of the ambient light, and the difference between the display brightness and the brightness of the ambient light is also greater than a brightness threshold value, it indicates that the display device 100 may be in a brighter environment, and the present display brightness of the display panel DP is too low. At this time, the processing circuit 150 will increase the driving power supplied by the power supply circuit 120 to the driving circuit 110, so as to increase the display brightness of the display panel DP. At the same time, the processing circuit 150 can control the power transmission circuit 130 to decrease the output power.

In one embodiment, the processing circuit 150 detects the recognition signal of object outside of the display device 100 by the human body sensor SNB (e.g., infrared sensor, image recognition module), and generates the detection signal according to the detection result. The human body sensor SNB can be exposed on the surface of the display device 100 to detect whether there is a moving object around the display device 100. In addition, the human body sensor SNB can determine whether the moving object is a human body. In some embodiments, the human body sensor SNB can include one or more of an infrared sensor, an audio sensor, an image sensor, and/or a chemical sensor, and is configured to detect whether a human body is around the display device 100 (e.g., determining sound magnitude, image contour, or carbon dioxide concentration). Since a person skilled in the art can understand the implementation of the human body sensor, and thus they are not further detailed herein.

In one embodiment, the object recognition signal detected by the human body sensor SNB can be a biometric parameter (e.g., sound magnitude, volume of the object, contour similarity). If the biometric parameter is greater than an identification threshold value, it indicates that the display device 100 is currently in operation and thereby a user is close to the display device 100. On the other hand, if the biometric parameter is lower than the identification threshold value, it indicates that no user is present around the display device 100 at this time. The processing circuit 150 can decrease the driving power or even stop the driving power supplied to the driving circuit 110.

As shown in Example B in the table above, in one embodiment, the processing circuit 150 can generate the detection signal according to the detection result of one or more of the thermal sensors SN1-SN6 and the light sensor SNA in addition to the detection result of the human body sensor SNB, so as to make a comprehensive determination. For example, when the biometric parameter is lower than the identification threshold value, and the ambient light or the internal temperature of the display device 100 is also simultaneously lower than another threshold value (e.g., brightness threshold value or temperature threshold value), the processing circuit 150 can decrease the driving power, and even turn off the driving circuit 110. At the same time, the processing circuit 150 may control the power transmission circuit 130 to increase the output power. On the other hand, when the biometric parameter is greater than the identification threshold value, and the ambient light or the internal temperature is also simultaneously greater than another threshold value, the processing circuit 150 may increase the driving power but decrease the output power.

In one embodiment, the processing circuit 150 detects the setting angle of the display device 100 by the direction sensor SNC (e.g., gyroscope, gravity sensor) and generates the detection signal. "Setting angle" can be the angle between the display panel of the display device 100 and the horizontal plane, or the placement/rotation angle of the display panel of the display device 100 relative to a hinge or pivot axis, such as portrait orientation or landscape orientation. The processing circuit 150 can selectively adjust the driving power and/or the output power according to the setting angle.

Figure 3B:
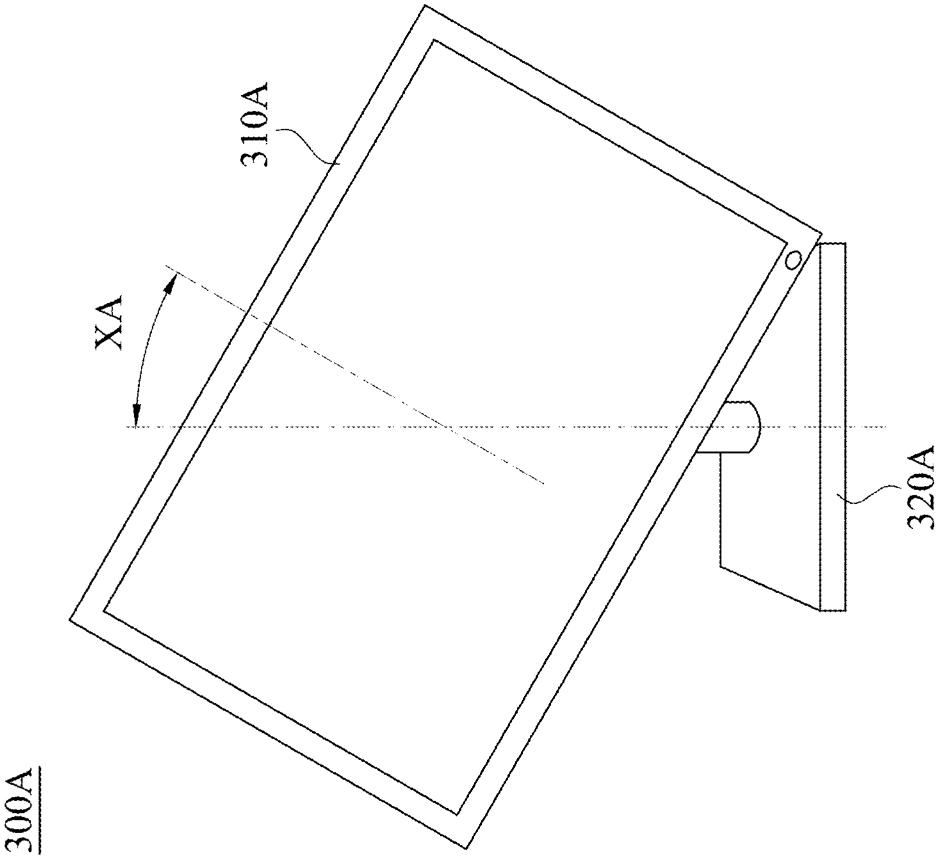
FIGS. 3A-3B are schematic diagrams of the display device in some embodiments of the present disclosure.
Figure 3A:
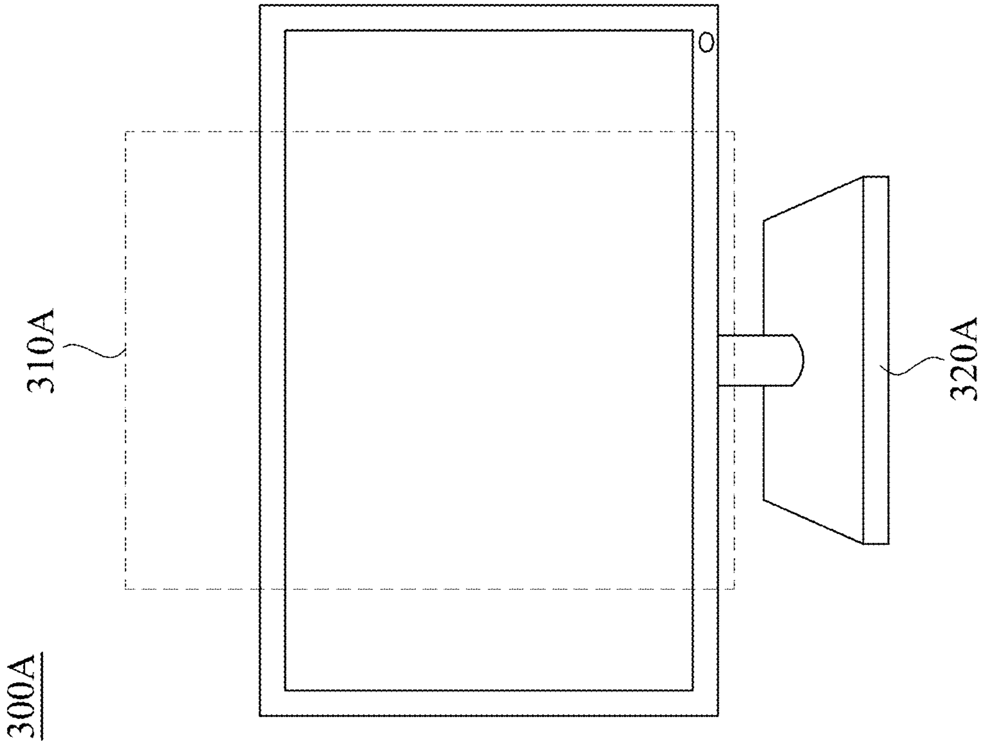

As shown in Example C in the table above, in one embodiment, the processing circuit 150 can obtain the detection signal(s) from the direction sensor SNC and the thermal sensors SN1-SN6, so as to selectively adjust the driving power and/or the output power. Referring to FIGS. 3A-3B, FIGS. 3A-3B show schematic diagrams of the display device 300A in some embodiments of the present disclosure. The display device 300A can be used to implement the display device 100 shown in FIGS. 1A and 1B, and may include one or more of the thermal sensors SN1-SN6, the light sensor SNA, the human body sensor SNB, and the direction sensor SNC shown in FIG. 1B. Therefore, in FIGS. 3A-3B, the similar components associated with the embodiment of FIGS. 1A-1B are labeled with the same numerals for ease of understanding. The specific principle of the similar component has been explained in detail in the previous paragraphs, and unless it has a cooperative relationship with the components of FIGS. 3A-3B, it is not repeated herein.

The display device 300A includes a monitor 310A and a docking base 320A. The display panel DP and the driving circuit 110 shown in FIGS. 1A and 1B are arranged in the monitor 310A. The power supply circuit 120, the power transmission circuit 130, the sensing circuit 140 and/or the processing circuit 150 can be arranged in the monitor 310A or the docking base 320A, and the present disclosure is not limited thereto. The setting angle XA between the monitor 310A and the docking base 320A can be freely adjusted. For example, the monitor 310A may be rotatably connected to the docking base 320A via a pivot mechanism, thus the monitor 310A can be rotated relative to the docking base 320A to change the setting angle XA. As shown in FIG. 3B, the setting angle XA refers to the angle between the centerlines of the monitor 310A and the docking base 320A. In this embodiment, the setting angle XA can range from positive 90 degrees to negative 90 degrees.

Figure 3C:
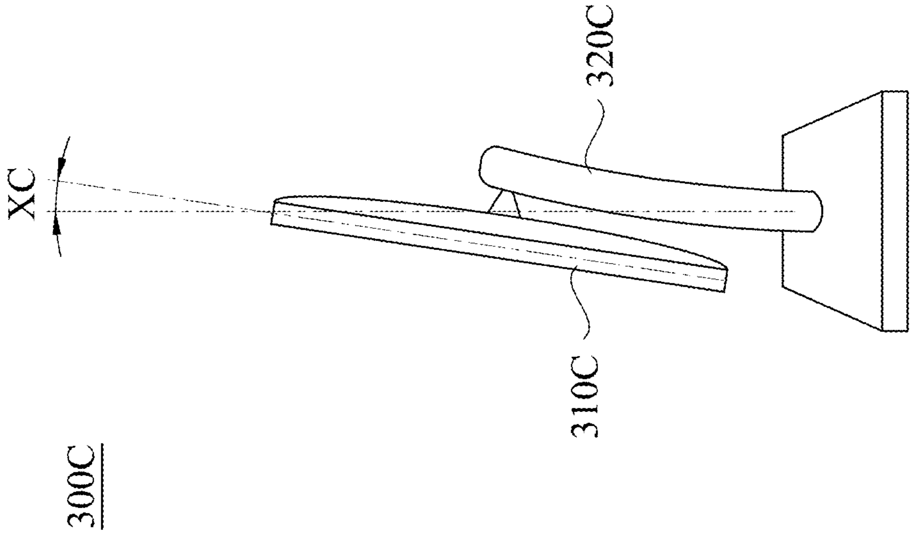
FIG. 3C is a schematic diagram of the display device in some embodiments of the present disclosure.

FIG. 3C is a schematic diagram of the display device 3000 in another embodiment of the present disclosure. The monitor 310C and the docking base 320C can be implemented by the monitor 310A and the docking base 320A shown in FIG. 3A, so it is not repeated herein. In the embodiment, the setting angle XC of the display device 3000 refers to the angle between the monitor 310C and a preset direction (e.g., a vertical line), and the display device 3000 can be rotated through a pivot mechanism to adjust the facing direction of the monitor 310A, such as being perpendicular to the horizontal plane, or tilted upward by 30 degrees.

As shown in FIGS. 1B and 3A-3C, in some embodiments, the direction sensor SNC can be arranged on the monitor 310A/310C to detect the relative angle with respect to the docking base 320A/320C. The processing circuit 150 is configured to generate the detection signal according to the setting angle XA/XC detected by the direction sensor SNC in order to adjust the driving power and/or the output power. The thermal sensors SN1-SN6 are disposed inside the monitor 310A/310C and generate the detection signal according to the internal temperatures of the monitor 310A/310C. In one embodiment, the thermal sensor can be a power sensor configured to detect the operating power of the monitor 310A/310C, which can be used to evaluate the present temperature.

The setting angle of the monitor will affect the internal temperatures of the display device. For example, as shown in FIGS. 3A and 3B, when the monitor 310A rotates from landscape orientation to portrait orientation, that is, the setting angle is 90°, heat dissipation of the monitor 310A in the portrait orientation is more difficult due to direction change of air flow in the structural or spatial configuration of the monitor 310A, thereby the internal temperatures will increase and affect circuit operations. The abovementioned structural configuration may include of the positions and directions of the heat dissipation holes, and the abovementioned spatial configuration may include the number and arrangement of the heat-generating electronic components in the monitor, wherein the relative directions and positions of these structures and components change with the orientation changes of the monitor 310A. Therefore, in one embodiment, when the processing circuit 150 of the display device 300A/300C determines that the setting angle XA/XC is not in a preset angle range (e.g., the setting angle is too large or too small), the processing circuit 150 may decrease the driving power to decrease the display brightness of the display panel DP, thereby preventing the internal temperatures from continuously increasing.

Furthermore, as shown in Example C of the table above, the processing circuit 150 can also make a comprehensive determination according to the internal temperatures (the detection signal) detected by one or more of the thermal sensors SN1-SN6 in addition to the setting angle detected by the direction sensor SNC. For example, when the setting angle XA/XC and the internal temperatures change simultaneously, it indicates that the position change of the monitor 310A/310C may have affected the internal heat dissipation of the display device 300A/300C. If any of the internal temperatures exceeds the temperature threshold value, the processing circuit 150 can decrease the driving power to decrease the display brightness of the display panel DP. Additionally, the processing circuit 150 can further decrease the power of the power transmission circuit 130 to decrease the output power.

Moreover, when the processing circuit 150 decreases the driving power, the processing circuit 150 can also simultaneously decrease the power supplied to the audio circuit (e.g., speaker) in the display device. Conversely, when the processing circuit 150 increases the driving power, the processing circuit 150 can simultaneously increase the power supplied to the audio circuit.

The present disclosure enables selective and dynamical adjustments of the driving power and the output power by detecting the internal or external states of the display device. Accordingly, the internal power of the display device can be utilized in an optimized manner, and the service life of the display device can be extended.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure covers modifications and variations of this present disclosure provided they fall within the scope of the following claims.

What is claimed is:

1. A display device, comprising:

a display panel;

a driving circuit, coupled to the display panel, configured to drive the display panel with a driving power;

a connection port electrically connected to an external device;

a power transmission circuit coupled to the connection port, configured to output an output power to the connection port;

a power supply circuit, coupled to the driving circuit and the power transmission circuit, configured to supply power to the driving circuit and the power transmission circuit;

a plurality of sensors selected from a group comprising: a thermal sensor, a light sensor, a human body sensor, and an orientation sensor, the plurality of sensors configured to sense at least one of a usage state and an environmental state of the display device and generate a detection signal corresponding to present operation state of the display device, wherein the plurality of sensors is configured to detect an internal temperature of the display device to generate the detection signal; and a processing circuit, coupled to the driving circuit, the power supply circuit, the power transmission circuit and the plurality of sensors, configured to determine a present operation state of the display device according to the detection signal, control the power supply circuit to dynamically adjust power distribution of the power supply circuit, wherein allocations of the driving power of the driving circuit and the output power of the power transmission circuit are dynamically adjusted, and wherein when the internal temperature is greater than a threshold value, the processing circuit decreases the driving power and the output power.

2. The display device of claim 1, wherein the display panel comprises a light source driving unit, and the light source driving unit is configured to receive the driving power to adjust a display brightness of the display panel.

3. The display device of claim 1, wherein the plurality of sensors is configured to detect an ambient light corresponding to the display panel or an object recognition signal outside the display device to generate the detection signal.

4. The display device of claim 3, wherein the processing circuit is configured to compare the ambient light and a display brightness of the display panel, when the display brightness is greater than the ambient light and a difference between the display brightness and the ambient light is greater than a brightness threshold value, the processing circuit decreases the driving power.

5. The display device of claim 3, wherein when the processing circuit determines the object recognition signal outside the display device is lower than a first threshold, the processing circuit decreases the driving power.

6. The display device of claim 3, wherein when the processing circuit determines the object recognition signal is lower than a first threshold, and the ambient light or the internal temperature is lower than a second threshold, the processing circuit decreases the driving power and increases the output power.

7. The display device of claim 1, wherein when the internal temperature returns to below the threshold value, the processing circuit first increases the driving power and then increases the output power.

8. The display device of claim 1, wherein the display device comprises a monitor and a docking base, the plurality of sensors is configured to detect a setting angle between the monitor and the docking base, and the processing circuit is configured to adjust a magnitude of the driving power and a magnitude of the output power according to the setting angle.

9. The display device of claim 1, wherein the connection port is a Type-C universal serial bus connector.

10. A control method of a display device comprising a display panel, a driving circuit, a connection port, a power transmission circuit, a power supply circuit, a plurality of sensors, and a processing circuit, the control method comprising:

the plurality of sensors sensing at least one of a usage state and an environmental state of the display device and generating a detection signal, wherein generating the detection signal comprises detecting an internal temperature of the display device;

the processing circuit determining a present operation state of the display device according to the detection signal;

the processing circuit controlling the power supply circuit to dynamically adjust power distribution of the power supply circuit, wherein a driving power of the driving circuit and an output power of the power transmission circuit are selectively adjusted, wherein selectively adjusting the driving power and the output power comprises: when the internal temperature is greater than a threshold value, decreasing the driving power and the output power;

outputting the driving power to drive the display panel; and outputting the output power to the connection port, wherein the connection port is electrically connected to an external device.

11. The control method of claim 1, wherein the plurality of sensors sensing at least one of the usage state and the environmental state of the display device and generating the detection signal comprises:

detecting an ambient light corresponding to the display panel or an object recognition signal outside the display device.

12. The control method of claim 11, wherein the processing circuit controlling the power supply circuit to dynamically adjust power distribution of the power supply circuit comprises:

comparing the ambient light and a display brightness of the display panel; and when the display brightness is greater than the ambient light, and a difference between the display brightness and the ambient light is greater than a brightness threshold value, decreasing the driving power.

13. The control method of claim 11, wherein the processing circuit controlling the power supply circuit to dynamically adjust power distribution of the power supply circuit comprises:

when determining the object recognition signal outside the display device is lower than a first threshold, decreasing the driving power.

14. The control method of claim 11, wherein the processing circuit controlling the power supply circuit to dynamically adjust power distribution of the power supply circuit comprises:

when the object recognition signal is lower than a first threshold, and the ambient light or the internal temperature is lower than a second threshold, decreasing the driving power and increasing the output power.

15. The control method of claim 10, wherein the processing circuit controlling the power supply circuit to dynamically adjust power distribution of the power supply circuit comprises:

when the internal temperature returns to below the threshold value, first increasing the driving power and then increasing the output power.

16. The control method of claim 10, wherein the display device comprises a monitor and a docking base, the monitor is connected to the docking base, and the plurality of sensors sensing at least one of the usage state and the environmental state of the display device and generating the detection signal comprises:

detecting a setting angle between the monitor and the docking base.

17. A non-transitory computer readable storage medium, applied to a display device, and stored at least one computer readable instruction, wherein the at least one computer readable instruction is executed by a processing circuit to perform a control method, and the control method comprises:

obtaining a detection signal from a plurality of sensors of the display device, wherein the detection signal is generated by the plurality of sensors according to at least one of a usage state and an environmental state of the display device, wherein obtaining the detection signal comprises detecting an internal temperature of the display device to generate the detection signal;

determining a present operation state of the display device according to the detection signal;

controlling a power supply circuit of the display device to dynamically adjust power distribution of the power supply circuit, wherein allocations of a driving power of a driving circuit and an output power of a power transmission circuit in the display device are dynamically adjusted, wherein dynamically adjusting the allocations of the driving power and the output power comprises: when the internal temperature is greater than a threshold value, decreasing the driving power and the output power;

controlling the power supply circuit to output the driving power to drive a display panel of the display device; and controlling the power transmission circuit to output the output power to a connection port, wherein the connection port is electrically connected to an external device.

18. The non-transitory computer readable storage medium of claim 17, wherein obtaining the detection signal from the plurality of sensors of the display device comprises:

detecting an ambient light corresponding to the display panel or an object recognition signal outside the display device to generate the detection signal.

* * * * *